United States Patent
Roloff

(10) Patent No.: US 7,226,258 B2
(45) Date of Patent: Jun. 5, 2007

(54) APPARATUS AND METHOD FOR TRANSPORTING MOTORCYCLES ON A TRAILER OR PICK-UP TRUCK AND AVOIDING ACCIDENTAL OR INADVERTENT DAMAGE THERETO

(76) Inventor: M. Mark Roloff, 2738 Birdview Rd., Westminster, MD (US) 21157

( * ) Notice: Subject to any disclaimer, the term of this patent is extended or adjusted under 35 U.S.C. 154(b) by 0 days.

(21) Appl. No.: 11/131,497

(22) Filed: May 18, 2005

(65) Prior Publication Data

US 2006/0263165 A1 Nov. 23, 2006

(51) Int. Cl.
*B61D 45/00* (2006.01)
(52) U.S. Cl. .................................... 410/119
(58) Field of Classification Search .............. 410/119, 410/118, 117, 122, 123, 124, 125
See application file for complete search history.

(56) References Cited

U.S. PATENT DOCUMENTS

| | | | | |
|---|---|---|---|---|
| 603,777 A | | 5/1898 | Skrine | |
| 2,674,206 A | * | 4/1954 | William | 410/119 |
| 2,856,867 A | | 10/1958 | Dasey | |
| 3,145,853 A | * | 8/1964 | Langenberg | 52/2.11 |
| 3,462,027 A | * | 8/1969 | Puckhaber | 410/119 |
| 3,667,625 A | * | 6/1972 | Lucas | 410/119 |
| RE27,615 E | * | 4/1973 | Brown, Jr. et al. | 410/125 |
| 3,915,096 A | | 10/1975 | Salisbury | 105/492 |
| 3,987,736 A | | 10/1976 | Miller | 105/491 |
| 4,076,872 A | * | 2/1978 | Lewicki et al. | 428/12 |
| 4,591,519 A | | 5/1986 | Liebel | 428/35 |
| 4,860,911 A | | 8/1989 | Jones, Sr. | 220/1.5 |
| 5,431,515 A | | 7/1995 | Sansone et al. | 410/119 |
| 5,533,616 A | | 7/1996 | Crowfoot | 206/335 |
| 5,660,512 A | * | 8/1997 | Elze et al. | 410/124 |
| 5,678,969 A | * | 10/1997 | Farrell et al. | 410/119 |
| 5,730,564 A | | 3/1998 | Howlett, Jr. | 410/119 |
| 5,740,573 A | * | 4/1998 | Boyd | 5/711 |
| 5,788,438 A | | 8/1998 | Goshorn et al. | 410/119 |
| 6,209,599 B1 | | 4/2001 | Richardson | 150/167 |
| 6,220,800 B1 | * | 4/2001 | Elze et al. | 410/119 |
| 6,253,806 B1 | * | 7/2001 | Sperry et al. | 141/314 |
| 6,322,303 B1 | * | 11/2001 | John | 410/119 |
| 6,435,787 B1 | | 8/2002 | John | 410/119 |
| 6,454,500 B1 | * | 9/2002 | Shetty | 410/119 |
| 6,457,921 B1 | | 10/2002 | Freeman | 410/119 |
| 6,508,484 B1 | | 1/2003 | Flemons | 280/304.3 |
| 6,527,488 B2 | | 3/2003 | Elze et al. | 410/119 |
| 6,537,003 B1 | * | 3/2003 | Rostoker | 410/119 |
| 6,769,848 B2 | | 8/2004 | Rostoker | 410/119 |
| 6,814,639 B1 | * | 11/2004 | Peterson | 441/41 |

FOREIGN PATENT DOCUMENTS

| | | | | |
|---|---|---|---|---|
| GB | 2222806 | * | 3/1990 | 410/119 |
| GB | 2267466 | * | 12/1993 | 410/119 |

* cited by examiner

*Primary Examiner*—H Gutman
(74) *Attorney, Agent, or Firm*—Armstrong, Kratz, Quintos, Hanson & Brooks, LLP

(57) ABSTRACT

A damage preventing system for use in preventing damage to motorcycles and the like when being conveyed on a transporting vehicle. Inflatable supporting cushions, anchored at selected locations to the transporting vehicle with use of attachment apertures, provide protection from damage resulting from contact between multiple motorcycles, or between a motorcycle and the transporting vehicle. Inflatable supporting cushions having multiple airtight chambers enable a user to provide various cushioning pressure to different portions of the motorcycle being protected from damage.

3 Claims, 7 Drawing Sheets

APPARATUS AND METHOD FOR TRANSPORTING MOTORCYCLES ON A TRAILER OR PICK-UP TRUCK AND AVOIDING ACCIDENTAL OR INADVERTENT DAMAGE THERETO

FIELD OF THE INVENTION

The present invention is an apparatus and method for providing damage protection to motorcycles or other recreational vehicles during transport on a trailer, pick-up truck bed, or other transporting vehicle.

BACKGROUND OF THE INVENTION

Many popular forms of recreation and sport are associated with motorcycles or other recreational vehicles. Such vehicles are often transported to an event or a location on a trailer, a pick-up truck, an enclosed van, or other transporting vehicle. Transporting, as opposed to simply riding the motorcycle, is often necessary, as "racing dirt bikes" for example, may not legally be driven on public highways. Also, it may be desired to transport a motorcycle to an event or to a location, instead of riding, because of inclement weather, desire to keep the motorcycle perfectly cleaned and polished, and various other reasons.

When it is desired to transport one or more motorcycles, they are typically transported on a trailer, in the bed of a pick-up truck, or inside an enclosed van. When transporting by any of those means, it is important for safety, as well as for protecting the motorcycles from physical damage, to securely fasten them to the transporting vehicle.

Typical means for fastening include the use of "bungee cords" or straps having ratchet-acting tightening means, which are attached at one end to the motorcycle, and hooked at the other end to anchoring means on the transporting vehicle. The motorcycles are most often oriented in the upright position. Additional devices, to improve the anchoring, can include recessed tracks on the transporting vehicle for receiving tires of the motorcycle and wheel chocks for preventing movement of the tires in forward and reverse directions. If more than one motorcycle is to be transported, the motorcycles are typically arranged to be side-by-side on the transporting vehicle. Other arrangements can include two motorcycles positioned in tandem or four motorcycles positioned both side-by-side and in tandem.

FIGS. 9A and 9B show examples of prior art apparatus and methods for securing motorcycles to transporting vehicles. In FIG. 9A, one motorcycle 1 is loaded on a bed of a pick-up truck 2. Flat nylon straps 3, having ratchet type tensioners 4 intermediate ends of the straps, are attached to the motorcycle and to anchors 5 located in the bed of the truck.

In FIG. 9B, two motorcycles 6 and 7 are loaded onto a flat platformed trailer 8 having protective sides 9. Flat straps 3 with tensioners 4 are attached at one end to anchors 5 and at the other end to the motorcycle to secure the motorcycles to the trailer. Additionally, recessed tracks 10 are provided in the base of the trailer to accept the tires of the motorcycles to prevent them from sliding sidewardly.

In the arrangements of FIGS. 9A and 9B it is also known to use "bungee cords" in place of the flat straps 3.

Although a motorcycle might be securely restrained with use of the various devices described above when loaded onto the transporting vehicle, during transit the devices can become slack due to vibration, braking and accelerating, jolts caused by pot-holes, and similar forces. If the slack becomes too great and the restraining devices become loosened or detached, the motorcycle can be physically damaged, or worse can cause a traffic accident if it falls from the transporting vehicle.

OBJECTS OF THE INVENTION

In view of the above possibilities for physical damage to the motorcycles, and the potential for causing a traffic accident, it is an objective of the present invention to provide a device and a method to safely and securely retain a motorcycle on a transporting vehicle.

It is an objective of the present invention to provide a device which does not decrease in effectiveness when subjected to forces encountered during travel.

It is another objective of the present invention to provide a device which is easily and quickly put into place when loading the motorcycles and easily and quickly removed when unloading.

It is still another objective of the present invention to provide a device which is not damaged in use by heat, oil, fuel, hydraulic fluid or protruding accessories found on a motorcycle.

It is yet another objective of the present invention to provide a device which does not cause damage, in use, to any part of a motorcycle being transported.

SUMMARY OF THE INVENTION

The present invention is a damage preventing system for use in combination with a transporting vehicle used for transporting one motorcycle. The vehicle has a bed and a pair of spaced-apart sidewalls, and the motorcycle is secured to the bed of the vehicle intermediately of the pair of sidewalls thereof, and generally parallel to the sidewall. At least two inflatable supporting cushions, including a first inflatable supporting cushion disposed between the motorcycle and one of the sidewalls of the vehicle, and a second inflatable supporting cushion disposed between the motorcycle and the other sidewall of the vehicle, are provided for preventing movement of the motorcycle relative to the sidewalls of the vehicle and thereby preventing damage to the motorcycles during the transporting thereof.

An embodiment for use when more than one motorcycle is being transported is a damage preventing system for use in combination with a transporting vehicle used for transporting at least two motorcycles. The vehicle has a bed and a pair of spaced-apart sidewalls, and the motorcycles are secured to the bed of the vehicle intermediately of the pair of sidewalls thereof, and generally parallel to each other and to the sidewalls. A plurality of at least three inflatable supporting cushions, including a first inflatable supporting cushion disposed between one of the motorcycles and one of the sidewalls of the vehicle, a second inflatable supporting cushion disposed between another motorcycle and the other sidewall of the vehicle, and an inflatable supporting cushion disposed between each of the motorcycles are provided for preventing movement of the motorcycles relative to each other and to the sidewalls of the vehicle, thereby preventing damage to the motorcycles during the transporting thereof

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1A:
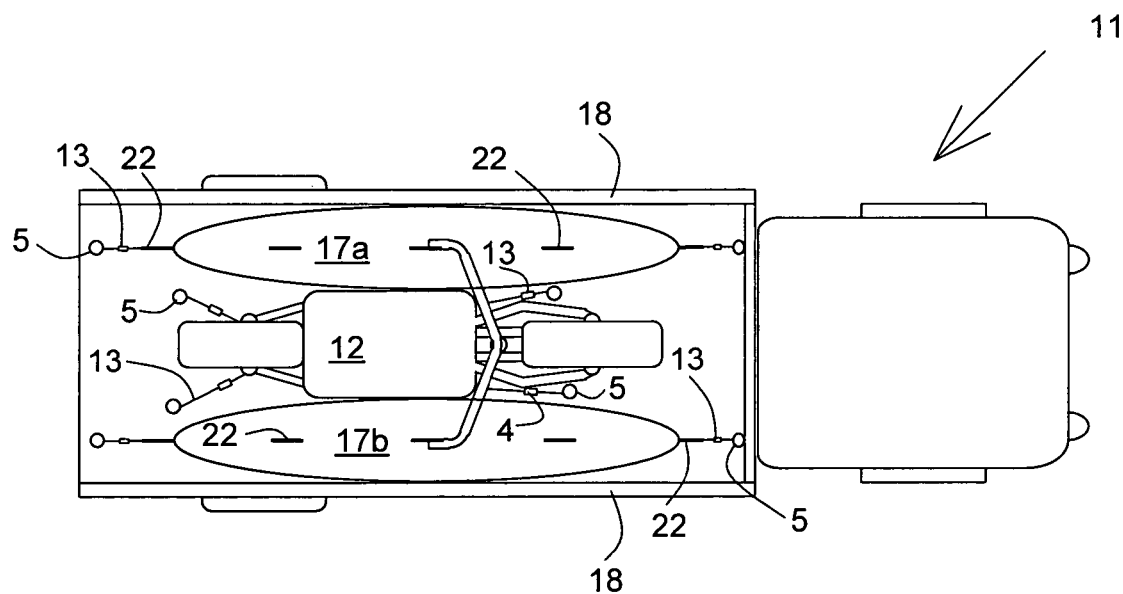
FIG. 1A is a top view of a single motorcycle loaded in the bed of a pick-up truck, utilizing devices of the present invention.
Figure 1B:
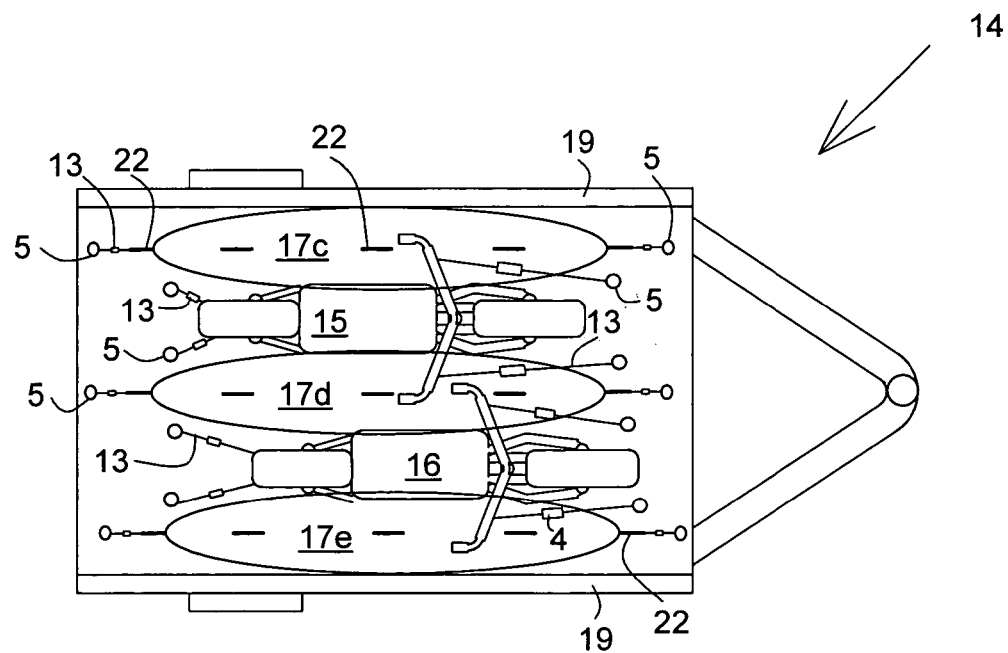
FIG. 1B is a top view of two motorcycles loaded on a trailer with sidewalls, utilizing devices of the present invention.

Throughout the description of the invention, its use is described for motorcycles. However, it is to be understood that the present invention is usable with "dirt bikes", mopeds, all-terrain vehicles, and similar recreational vehicles. Also, FIGS. 1A and 1B depict the present invention in use with one motorcycle in the bed of a pick-up truck, and two motorcycles on a trailer, respectively. FIGS. 1A and 1B are solely two examples of the use of the present invention, as combinations of any number of motorcycles on any type of transporting vehicle are possible.

In FIG. 1A, pickup truck 11 has loaded thereon motorcycle 12. The motorcycle is secured initially with straps or "bungee cords" 13.

In FIG. 1B, trailer 14 has loaded thereon motorcycles 15 and 16 secured initially with straps or "bungee cords" 13.

Figure 2:
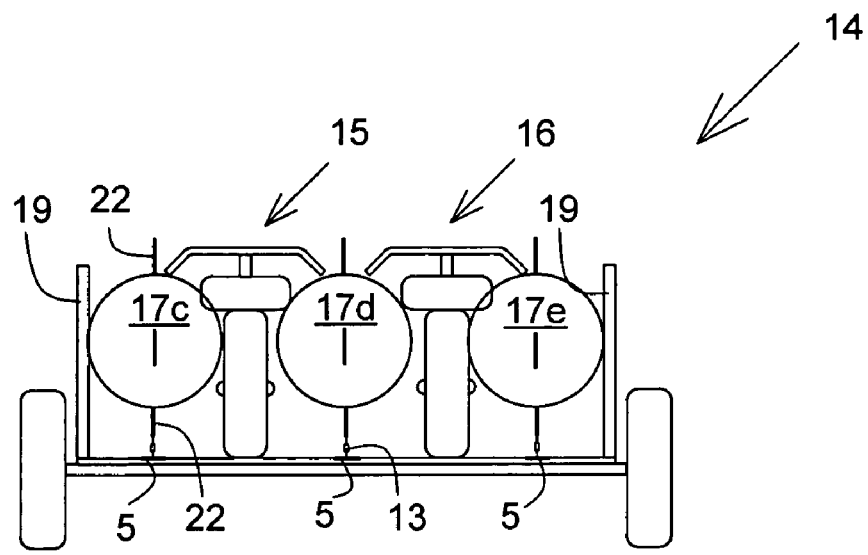
FIG. 2 is an end view of the two motorcycles and devices of the present invention, as shown in FIG. 1B.

In FIGS. 1A and 1B, devices of the present invention, inflatable supporting cushions 17a–17e, are shown. The inflatable supporting cushions are provided to support the motorcycles in an upright position and to provide a cushioned protective separation between the motorcycles or between a motorcycle and sidewalls 18 and 19 of the transporting vehicles. In FIG. 2, an end view of the motorcycles 15 and 16 is shown with the inflatable supporting cushions 17c–17e.

Details of an inflatable supporting cushion are shown in FIGS. 5–8B. Inflatable supporting cushion 17 is at least one air-tight chamber which is inflatable and deflatable for either use or storage, respectively. In a preferred embodiment the inflatable supporting cushion 17, when fully inflated, has the shape of an ellipsoid having a substantially circular cross-section (see FIG. 6A) in a plane perpendicular to a central longitudinal axis 101 and having a substantially elliptical cross-section (see FIG. 6B) in a plane which encompasses the central longitudinal axis 101. Although such shape is preferred, other shapes, such as an arched ellipsoid (banana shaped), are available in practice of the invention.

As mentioned above, the inflatable supporting cushions are positioned, in use, either between two motorcycles, or between a motorcycle and a sidewall of the transporting vehicle. Therefore, the inflatable supporting cushions, having walls 102, may be in contact with heat from an exhaust system, fuel or other fluids associated with motorcycles, as well as protruding components of a motorcycle. In view of such potentially harmful elements, a heat tolerant and chemical tolerant material of sufficient toughness to resist puncture by components of a motorcycle is required for fabrication of the walls 102 of the inflatable supporting cushion. Materials of the walls 102, for fabrication of the inflatable supporting cushion include Neoprene, PVC, and Hypalon (E. I. duPont de Nemours & Co., Wilmington, Del. 19898). The wall thickness can be between $1/16$ and $3/16$ of an inch (24–34 gauge), with about $1/8$ of an inch thickness (28 gauge) being preferred. Other materials are also available for the walls 102 in practice of the invention.

The inflatable supporting cushion can be fabricated by cutting two similarly sized elliptical panels of the material for the walls 102 and binding like edges together to form the ellipsoid. Although solely two panels are described for forming the device, use of additional panels produce a finished product which is closer to the mentioned ellipsoid shape. The shape of the device varies somewhat depending on the number of elliptical panels used and on the inflation pressure, discussed below. The preferred manner if binding together the edges of the elliptical panels of the material which form the walls is by electronic welding. However, any method which strongly binds the panels together is available in practice of the invention.

Figure 5:
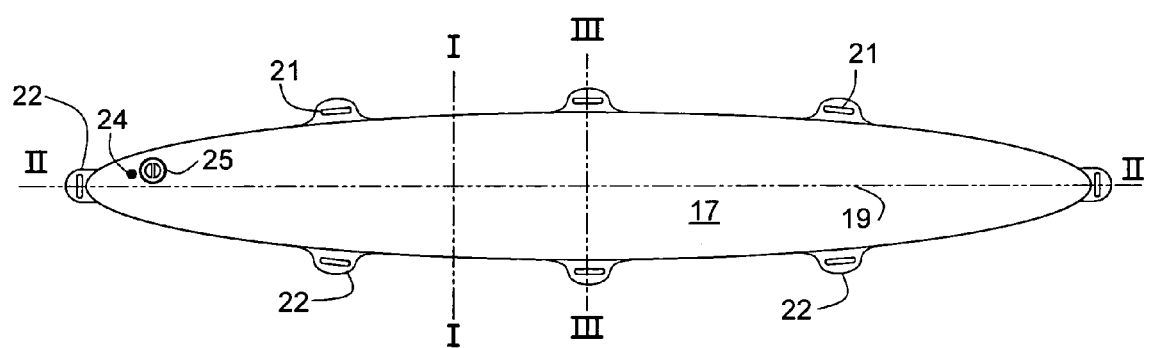
FIG. 5 is a side view of a device of the present invention.
Figure 6A:
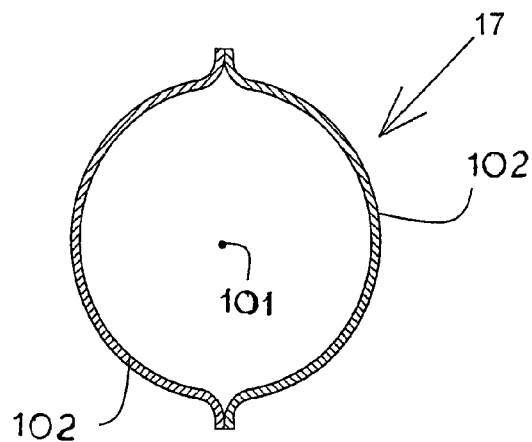
FIGS. 6A and 6B, and 6C are cross-sectional views of the device as shown in FIG. 5, taken at planes I, II, and III respectively, as indicated in FIG. 5.
Figure 6B:
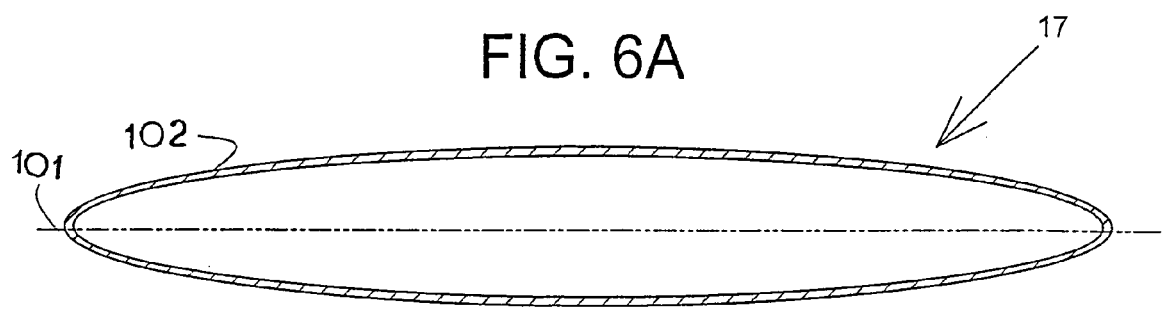
Figure 6C:
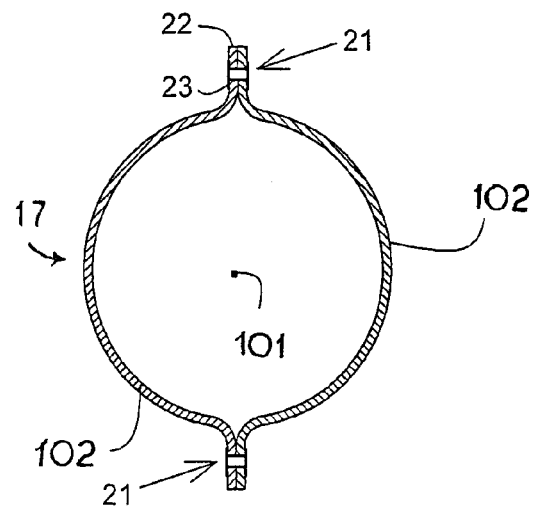

Unlike the construction of the football, for example, having edges of the bound panels directed inward toward the inflated chamber, the edges of the present invention are preferably directed outward. Such outwardly directed material can provide locations for placement of apertures 21, shown in FIG. 5, for use in securing the inflatable supporting cushions to the transporting vehicle. To provide the locations for the apertures 21, lobes 22 are provided along edges of the elliptical panels as they are cut from a sheet of the material. Then, when binding the edges of the elliptical panels, portions of the two layers shaped as lobes are also bound together and the apertures are formed in the lobes. As shown in FIG. 6C, edges of the apertures 21 are preferably reinforced with eyelets 23 in order to prevent tearing of the material during use. The apertures are preferably of an elongated shape in order to accommodate flat belting, as discussed below. As shown in FIG. 5 a plurality of apertures are located along a top portion and a bottom portion (as positioned in use) of the device and one aperture is located at each end of the device. Such locations enable the device to be secured to the transporting vehicle in order to withstand forces directed along its length and also directions perpendicular to the length of the device. In use, the cushion is restrained in three mutually-perpendicular axes. Either "bungee cords" or flat straps having ratchet-type tightening devices can be used to connect between the apertures 21 and anchors 5 provided in the bed of the transporting vehicle.

As mentioned above, inflatable supporting cushion 17 is an air tight chamber. The cushioning properties of the device are realized by inflating the device with compressed air. In order to accomplish such inflating, inflation means 24 (FIG.

Figure 8A:
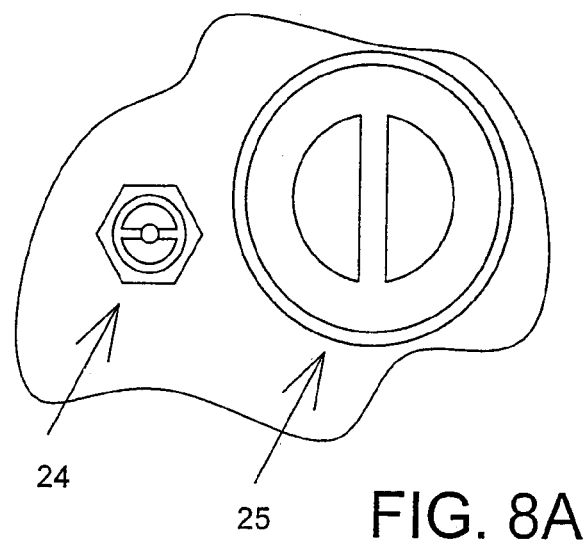
FIG. 8A is an enlarged view of inflating and deflating components of the present invention.
Figure 8B:
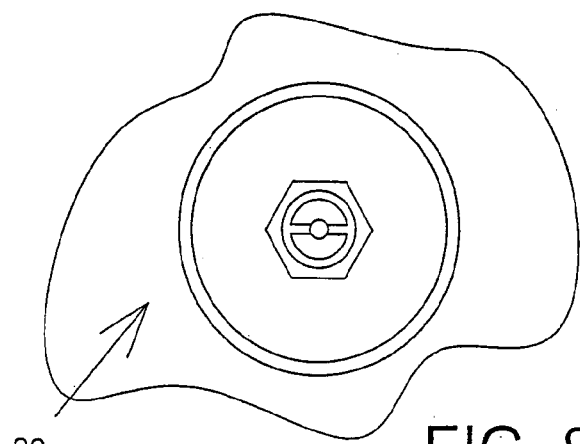
FIG. 8B is an enlarged view of another inflating and deflating component of the present invention.
Figure 9A:
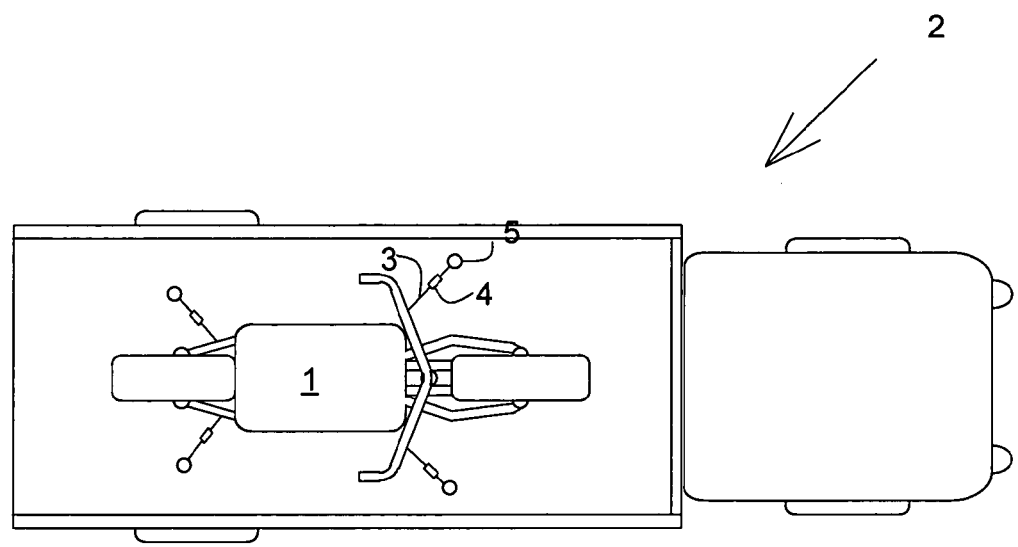
FIG. 9A is a top view of a single motorcycle loaded in the bed of a pick-up truck, as in the prior art.
Figure 9B:
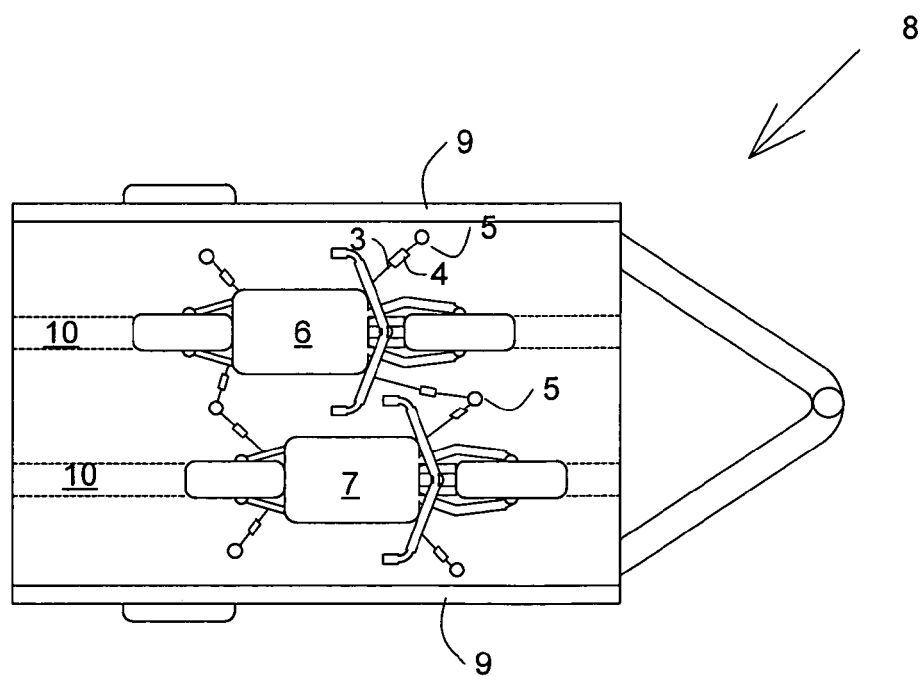
FIG. 9B is a top view of two motorcycles loaded on a trailer with sidewalls, as in the prior art.

8A) is provided in the walls of the device. In a preferred embodiment, an air valve, known as a Schrader valve as found on a tire, is provided and inflation can be carried out with use of an air compressor, as might be found in a user's garage or at a service station. When "on the road", a portable compressor which can be plugged into a power outlet of the transporting vehicle can be used. In order to deflate the device, a deflating means 25 of FIG. 8A is provided. In the preferred embodiment a "Boston Valve" available from Dick's Sporting Goods, Pittsburgh, Pa. 15275 is used to enable rapid deflation of the device when it is desired to remove a motorcycle from the transporting vehicle. A pump such as QuickPump™, manufactured by the Coleman Company, Wichita, Kans., 67219, or the like, which can be used with the Boston valve, can be used to conveniently inflate and deflate the inflatable supporting cushion. As shown in FIG. 8B, a combined inflating/deflating valve 26, which is known for use with rafts and air mattresses, can be used in fabricating the present device. The inflating and deflating valves are preferably located near an end of the device for ease of access. For additional convenience, one of each of the valves can be located at both ends, if desired. In use, the inflatable supporting cushions are inflated to a pressure of between 20 and 40 psi. Added features of the invention include a pressure relief valve (not shown) to assure that over inflating does not occur, or a pressure indicating device (not shown), near the inflating means, for monitoring the pressure within the chamber being inflated.

Figure 7:
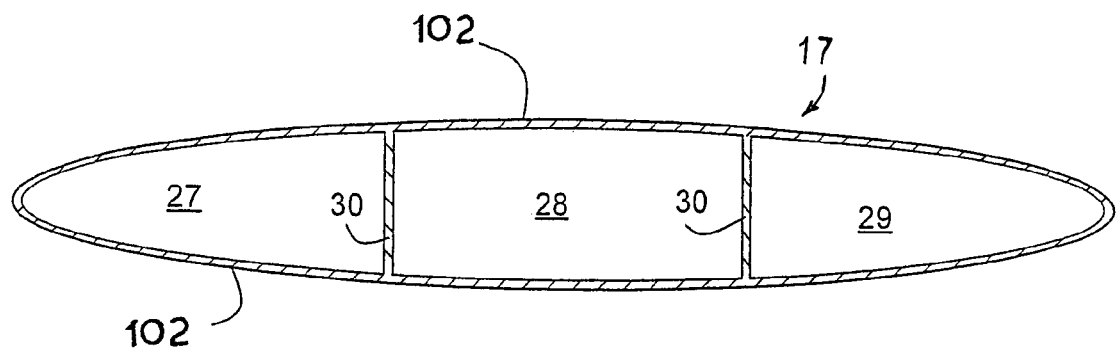
FIG. 7 is a cross-sectional view of the device of the present invention, taken in a plane through the central longitudinal axes, for showing an embodiment of the present invention having multiple inflatable chambers.

In another embodiment of the invention, the air-tight chamber is divided into a plurality of chambers as shown at 27, 28 and 29 in FIG. 7. Such arrangement enables inflation of the various chambers to differing pressures, if desired, in order to provide for the most advantageous cushioning of the supported motorcycle. With multiple chambers, an inflation and deflation mechanism is provided for each chamber. In a preferred embodiment having multiple chambers, chamber dividers 30 are at a distance of about 30% of the total length, from each end. Having a plurality of chambers enable use of a lower pressure, for example, at locations of side "bags" on a motorcycle. In either the single chamber embodiment or the multiple chamber embodiment, it is preferred to have the inflatable support cushion symmetrical about a centerpoint of the device so that an up/down or front/back type orientation is not a concern during use of the invention. The inflatable supporting cushion 17 can be sized to provide the best "fit" for the motorcycle, or the like, being transported, and the transporting vehicle being used. For example, the preferred size for use in transporting a motorcycle in the bed of pick-up truck is about 8 feet long and a diameter at its mid-point of about 1.5 feet. For other applications, lengths of 6–feet and mid-point diameters of 1–2 feet provide the best protection.

The device of the invention, when in a deflated condition, is substantially flat. That is, the two elliptically shaped panels are stacked one on the other (having their edges welded, as described above). In such a condition the device is easily stored. An added feature of the invention includes velcro faced straps, which facilitate storage of the device. With use of such straps the device can be rolled-up and maintained in the rolled-up condition with use of the straps. In the rolled-up condition the device can easily be stored in a convenient carrying bag.

An additional feature of the present invention is a composite or layered material forming the walls 19 of the inflatable supporting cushions. For example, a layer of PVC bonded on a layer of a velvet fabric. Use of such a material, with the velvet fabric on the external surface of the device, prevents any damage to a painted surface or a plated surface of the motorcycle which might occur from a rubbing action taking place during long periods of highway travel.

Figure 4A:
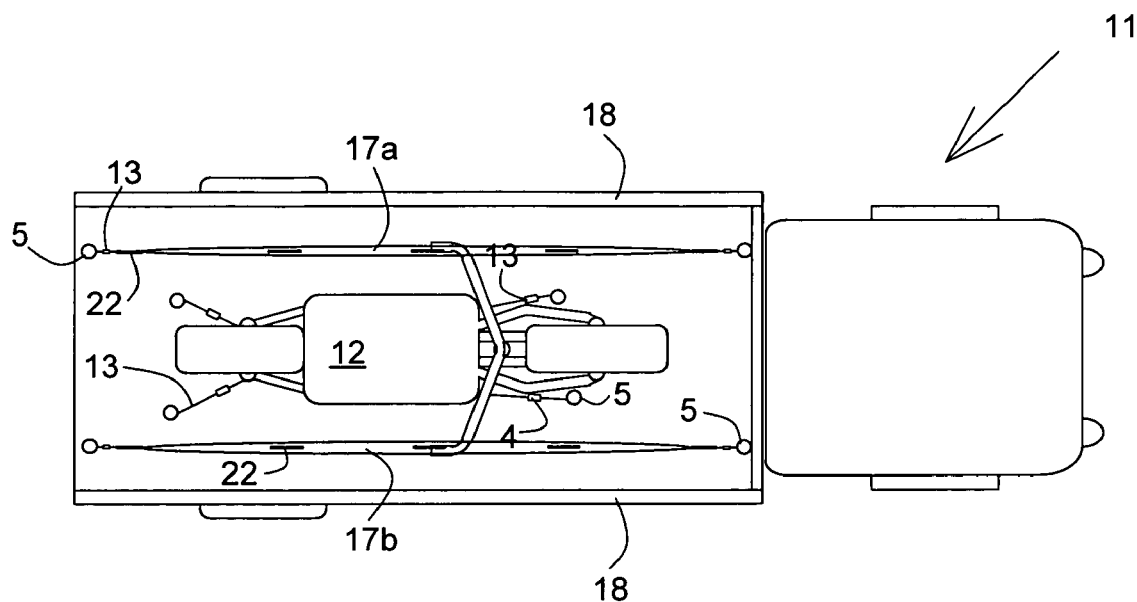
FIG. 4A is a top view of the motorcycle loaded in the bed of a pick-up truck, as shown in FIG. 1A, having the devices of the invention in a fully deflated condition.

Referring to FIGS. 1A and 4A, the preferred method of use of the inflatable supporting cushions with one motorcycle in a bed of a pick-up truck is described as follows:

1) a non-inflated inflatable supporting cushion 17 is loosely anchored to the pick-up truck bed along one sidewall 18, with use of the apertures 21, truck bed anchors 5, and bungee cords or adjustable straps 13, as shown in FIG. 4A;

2) the above step is repeated for another non-inflated inflatable supporting cushion along the other sidewall 18, as shown in FIG. 4A;

3) the motorcycle 12 is positioned between the two non-inflated inflatable supporting cushions 17a–17b and anchored to the pick-up truck bed, as shown in FIG. 4A;

4) the inflatable supporting cushions are then inflated to the desired pressure, as shown in FIG. 1A; and 5) the anchoring devices 13 for the inflatable supporting cushions are adjusted to eliminate any slack.

For removal of the motorcycle from the bed of the truck, the inflatable supporting cushions are deflated with use of the deflating valves 25, and the anchors for the motorcycle are removed. It is not necessary to remove the non-inflated inflatable supporting cushions if the motorcycle is to be reloaded for a return transporting trip, for example.

A procedure for loading two motorcycles, located side-by-side on a trailer having sidewalls, for example, is similar to the above example. Referring to FIGS. 1B and 2, inflatable supporting cushions 17c and 17e in a non-inflated condition are positioned and loosely anchored along sidewalls 18, followed by positioning and anchoring motorcycles 15 and 16 next to the inflatable supporting cushions. Next, an inflatable supporting cushion 17d in a non-inflated condition is inserted between the motorcycles and loosely anchored. The inflatable supporting cushions are then inflated, and any slack in the anchoring devices for the inflatable supporting cushions is eliminated.

Figure 3:
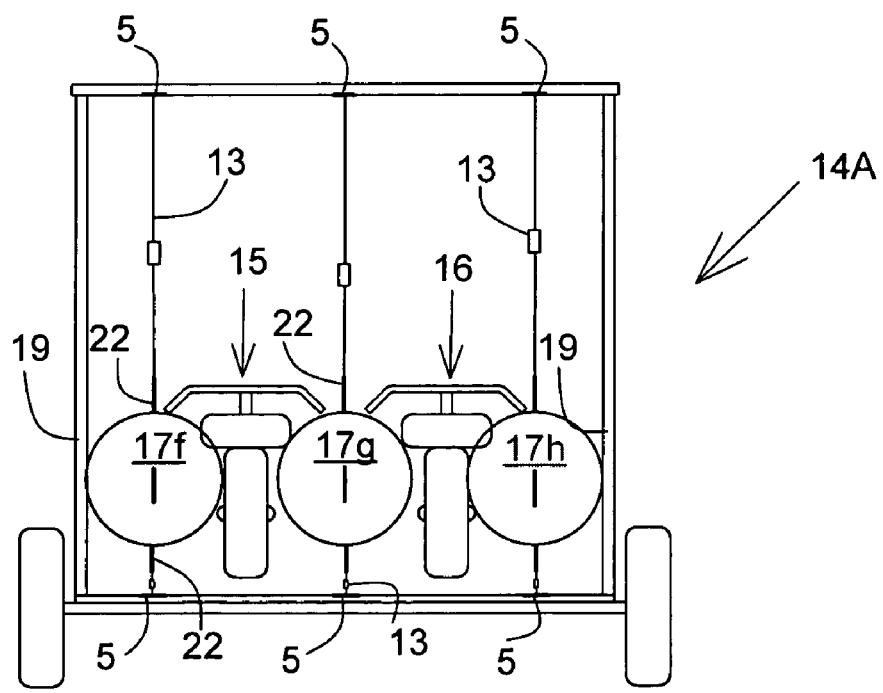
FIG. 3 is an end view of two motorcycles loaded on an enclosed trailer, utilizing devices of the present invention.
Figure 4B:
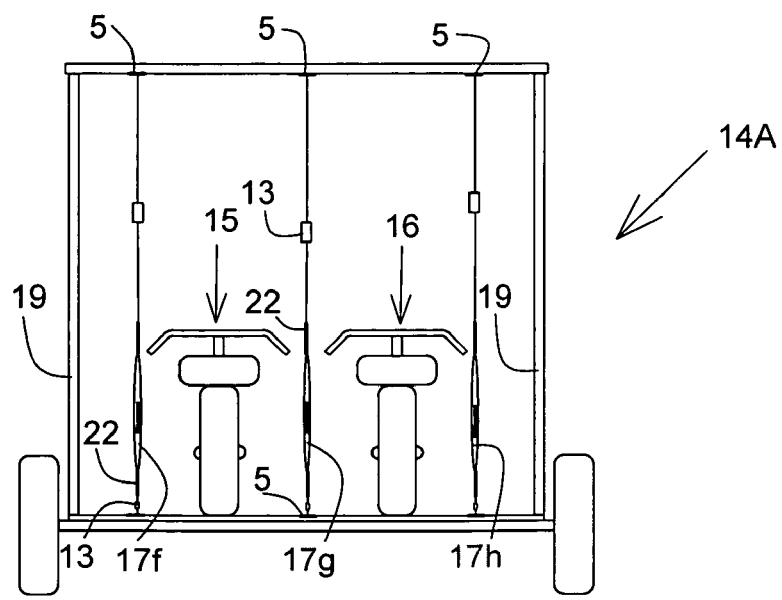
FIG. 4B is an end view of the motorcycles loaded on an enclosed trailer, as shown in FIG. 3, having the devices of the invention in a fully deflated condition.

Referring to FIGS. 3 and 4B, another procedure, for loading two motorcycles in an enclosed trailer 14A, is described as follows:

1) Inflatable supporting cushions 17f, 17g, and 17h in a non-inflated condition are loosely anchored to the trailer bed and the trailer ceiling with the use of bungee cords or adjustable flat straps 13, and anchors 5 in the bed and the ceiling of enclosed trailer 14A as shown in FIG. 4B;

2) motorcycles 15 and 16 are positioned between the inflatable supporting cushions and anchored to the bed of the enclosed trailer;

3) the inflatable supporting cushions 17f–17h are inflated to the desired pressure; and 4) the anchoring devices for the inflatable supporting cushions are adjusted to eliminate any slack, as shown in FIG. 3.

When inflating the cushions, a variety of options are available to suit the type of transporting vehicle, type of motorcycle being transported, accessories included on the motorcycle, and preferences of the user. For example, the cushions can be inflated to a relatively low pressure at which the cushions do not actually make contact with the motorcycles. In that condition, the cushions still prevent damage by providing a cushion if one of the securing straps fail or if slack develops in a number of the securing straps.

In another example, using an inflatable supporting cushion having multiple chambers, a center chamber can be inflated to provide contact with the motorcycle and a relatively solid cushioning and holding force against a center portion of the motorcycle, while another chamber, near a portion of the motorcycle where side "bags" are hung, can be inflated to a relatively low pressure in order not to apply too much force to the "bags" and their contents.

While specific materials, dimensional data, etc. have been set forth for purposes of describing embodiments of the invention, various modifications can be resorted to, in light of the above teachings, without departing from Applicant's novel contributions; therefore in determining the scope of the present invention, reference shall be made to the appended claims.

What is claimed is:

1. In combination with a transporting vehicle used for transporting one motorcycle, wherein the vehicle has a bed and a pair of spaced-apart sidewalls, and wherein the motorcycle is secured to the bed of the vehicle intermediately of the pair sidewalls thereof, and generally parallel to the sidewalls, a damage preventing system, comprising:
    at least two inflatable supporting cushions, including
    a first inflatable supporting cushion disposed between the motorcycle and one of the sidewalls of the vehicle, and
    a second inflatable supporting cushion disposed between the motorcycle and the other sidewall of the vehicle,
    said inflatable supporting cushions being for preventing movement of the motorcycle relative to the sidewalls of the vehicle and thereby preventing damage to the motorcycles during the transporting thereof, and
    wherein each said inflatable supporting cushion is provided with attachment means for use in anchoring said inflatable supporting cushion to the bed of the transporting vehicle, wherein sheets of said fabricating material are cut to have an elliptical shape and to include lobes along edges thereof for use in providing said attachment means used in anchoring said inflatable supporting cushion to the bed of the transporting vehicle.

2. A cushioning system for a motorcycle being transported on a vehicle, wherein the vehicle has a platform, and wherein restraining means are provided to restrain the motorcycles against movement on the platform, comprising
    an elongated inflatable member on each side of the motorcycle, each inflatable member having a central section and respective end sections tapering therefrom, such that each section may be inflated to a selected pressure, the inflatable members thereby cushioning the motorcycle against substantial movement laterally of the vehicle,
    means for precluding lengthwise movement of the inflatable members longitudinally of the vehicle, and
    means for precluding upward movement of the inflatable members away from the platform of the vehicle, such that the inflatable members are substantially restrained in three mutually-perpendicular axes, and such that the motorcycle will be cushioned against movement and damage thereto in the event of a failure of the motorcycle restraining means while the motorcycle is being transported.

3. The cushioning system of claim 2, wherein the tapered end sections of the inflatable members are symmetrical, such that the inflatable members are reversible longitudinally thereof.

* * * * *